US009160910B2

(12) United States Patent
Verkuijlen et al.

(10) Patent No.: US 9,160,910 B2
(45) Date of Patent: Oct. 13, 2015

(54) SYSTEM AND METHOD FOR FIXING AN IMAGE SENSOR TO A BEAMSPLITTER

(75) Inventors: Robert Verkuijlen, Zuiderkruisiaan (NL); Nicolaas Johannes Damstra, Zwanebloem (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 999 days.

(21) Appl. No.: 12/231,617

(22) Filed: Sep. 4, 2008
(Under 37 CFR 1.47)

(65) Prior Publication Data
US 2010/0091148 A1    Apr. 15, 2010

(30) Foreign Application Priority Data
Sep. 5, 2007   (EP) ..................... 07301338

(51) Int. Cl.
H04N 5/225   (2006.01)
H04N 9/097   (2006.01)
H04N 9/04    (2006.01)

(52) U.S. Cl.
CPC ........... *H04N 5/2253* (2013.01); *H04N 5/2254* (2013.01); *H04N 9/097* (2013.01); *H04N 9/045* (2013.01)

(58) Field of Classification Search
CPC ... H04N 5/2253; H04N 5/2254; H04N 9/045; H04N 9/097
USPC ............ 348/335–340, 373–4; 438/64–66, 69, 438/72
See application file for complete search history.

(56) References Cited

U.S. PATENT DOCUMENTS

| 4,172,547 | A  |   | 10/1979 | Delgrande |
|-----------|----|---|---------|-----------|
| 4,591,901 | A  | * | 5/1986  | Andrevski ..................... 348/337 |
| 4,789,891 | A  | * | 12/1988 | Kanayama et al. ........... 348/337 |
| 4,916,529 | A  |   | 4/1990  | Yamamoto et al. |
| 5,340,420 | A  |   | 8/1994  | Ozimek et al. |
| 5,805,218 | A  | * | 9/1998  | Ohura et al. .................. 348/353 |
| 5,909,027 | A  | * | 6/1999  | Ohura et al. ................ 250/208.1 |
| 5,952,646 | A  | * | 9/1999  | Spartiotis et al. .......... 250/208.1 |
| 6,547,722 | B1 | * | 4/2003  | Higuma et al. ............... 600/133 |
| 7,349,604 | B2 | * | 3/2008  | Clark .............................. 385/52 |
| 2002/0043674 | A1 | * | 4/2002 | Haga et al. .................... 257/294 |
| 2003/0020129 | A1 |   | 1/2003 | Saita |

(Continued)

FOREIGN PATENT DOCUMENTS

DE   19846143   4/2000
EP   1804489    7/2007

(Continued)

OTHER PUBLICATIONS

Search report dated Feb. 14, 2008.

(Continued)

*Primary Examiner* — Daniel M Pasiewicz
(74) *Attorney, Agent, or Firm* — Arent Fox LLP

(57) ABSTRACT

Exemplary embodiments of the present invention relate to a method for fixing an image sensor to a beamsplitter. An exemplary method comprises placing a first fixative agent comprising an ultraviolet adhesive between the image sensor and the beamsplitter and positioning the image sensor relative to the beamsplitter. The position of the image sensor is initially fixed relative to the beamsplitter by the first fixative agent. The exemplary method further comprises securing the image sensor to the beamsplitter with a second fixative agent.

19 Claims, 3 Drawing Sheets

(56) References Cited

U.S. PATENT DOCUMENTS

| | | | |
|---|---|---|---|
| 2005/0029641 A1* | 2/2005 | Ikeda | 257/678 |
| 2007/0042530 A1* | 2/2007 | Kim et al. | 438/108 |
| 2007/0069629 A1* | 3/2007 | Ohishi et al. | 313/495 |

FOREIGN PATENT DOCUMENTS

| | | | | |
|---|---|---|---|---|
| JP | S60-139384 | | 6/1985 | |
| JP | S61-174816 | | 7/1986 | |
| JP | 61296319 A | * | 12/1986 | |
| JP | S62-047288 | | 3/1987 | |
| JP | 63031097 A | * | 2/1988 | |
| JP | S63-081481 | | 4/1988 | |
| JP | H02-140067 A | | 8/1988 | |
| JP | 63229979 A | * | 9/1988 | H04N 5/335 |
| JP | 01112767 A | * | 5/1989 | H01L 27/14 |
| JP | 01126869 A | * | 5/1989 | H04N 1/028 |
| JP | S01-078870 | | 7/1989 | |
| JP | 02140067 A | * | 5/1990 | H04N 5/225 |
| JP | H03-017653 | | 8/1991 | |
| JP | 04330265 A | * | 11/1992 | |
| JP | 04330892 A | | 11/1992 | |
| JP | 2002-328292 A | | 11/2002 | |
| JP | 2002328292 A | * | 11/2002 | G02B 7/18 |
| JP | 2003232907 A | | 8/2003 | |
| WO | 0191193 A | | 11/2001 | |

OTHER PUBLICATIONS

Japanese Office Action with Application No. 2008-225416 dispatched on Jul. 30, 2013.
Extended European Search Report and EP Search Opinion dated Dec. 4, 2008 regarding EP08163429.7.
Notice of Reasons for Refusal mailed Jun. 30, 2015 regarding Japan Patent Application No. JP2014-137699.

* cited by examiner

SYSTEM AND METHOD FOR FIXING AN IMAGE SENSOR TO A BEAMSPLITTER

This application claims is the benefit, under 35 U.S.C.§119 of EP Patent Application 07301338.5, filed Sep. 5, 2007.

FIELD OF THE INVENTION

The present invention relates to the assembly of components used in video imaging systems such as digital video cameras. In particular, exemplary embodiments of the present invention relate to accurately positioning image sensors adjacent to a beamsplitter such as a color separation prism.

BACKGROUND OF THE INVENTION

High quality digital cameras typically employ multiple image sensors so that a separate image sensor may be used to process data for a red color component, a blue color component and at least one green color component. In such systems, a beamsplitter such as a color separation prism is typically employed to split light received through a lens into the respective red, blue and green color components. Each respective color component is delivered to an image sensor associated with that color component. Accurate positioning of the beamsplitter relative to the individual image sensors is needed to ensure the best picture quality possible. Indeed, accurate positioning of the image sensors relative to the beamsplitter on the sub-micron level is desirable.

Examples of environmental, production and functional factors that may have an impact on the positioning accuracy of an image sensor include temperature, humidity, external forces, internal stress within adhesives, fixation methods or the like. Additional factors that may be relevant when positioning an imager relative to associated optical components include the desire to reduce material costs, the desire to increase the recycle-ability of image sensors, the desirability of good cleaning condition of glass surfaces to increase yield, the displacement of components during fixation or the like.

A known photo-electric conversion device generates electrical signals in response to the light from an optical system including a prism assembly having plural light emitting faces. The prism assembly separates the light from the optical system into plural light components, including plural solid-state sensors adjoining the light emitting faces of the prism assembly. The light emitting faces and image sensors are provided with adhering or metalized areas to fix a first surface of a spacer with glue or solder onto each light emitting face and sensor image. Each spacer has a second metalized surface appropriate for stiffly connecting one solid-state sensor to the prism by soldering or adhering.

U.S. Pat. No. 5,042,913 to Yamamoto discloses an apparatus for firmly mounting solid-state image sensors to an image splitting prism in which a mounting glass block is bonded to an image splitting prism surface or to a glass plate bonded to a prism. A metal film is formed on the glass block, and a preliminary solder layer is formed on the metal film to improve wettability. A gap between the preliminary solder layer and a meltable metal member formed on a caging of a solid-state image sensor is filled with a meltable metal having a predetermined thickness, thus bonding the preliminary solder layer and the meltable metal member. When this construction can be obtained, the total thickness of the metal film can be reduced to 1.mu.m or less.

U.S. Pat. No. 5,340,420 to Ozimek, et al. discloses a method for bonding a color separation filter to an image sensor. The method comprises the steps of dispensing an optical coupling composition on a preselected surface of at least one of the filter and sensor, bonding the filter to the sensor for creating a filter-sensor assembly, by using a predetermined amount of ultraviolet (UV) curable adhesive at an interface of the filter-sensor assembly, and dispensing an epoxy along a periphery of the filter-sensor assembly, thereby encapsulating the optical coupling composition at the interface of the filter-sensor assembly.

U.S. Pat. No. 6,256,118 to Moriarty, et al. discloses a film scanner in which a CCD image sensor is aligned to a film plane scanning aperture and is mounted to the an intervening imaging housing assembly by means of a radiation (UV) curable adhesive of appropriate viscosity. With the sensor positioned within but in spaced apart relationship to a sensor housing segment of the housing assembly, the adhesive is injected through a mounting hole in a wall of the housing segment to adhere to the image sensor. An excess amount of the injected adhesive forms a cap over the mounting hole. The viscosity of the adhesive is selected such as to allow the adhesive to generally maintain its shape in the space between the sensor and the wall of the sensor housing segment. The spacing of the sensor from the sensor housing segment allows six degrees of freedom of movement of the sensor during the alignment operation after which the injected adhesive is curing in situ to form a sensor mount fastener with the sensor is precise alignment with the film plane aperture. The hardened cap over the mounting hole provides a solid mechanical bond of the fastener to the housing segment.

U.S. Patent Publication No. 20050195503 to Chen discloses a digital camera module for a portable electronic device. The digital camera module includes a barrel containing a first lens and a second lens, a holder containing part of the barrel, and an image sensor below the first and second lenses. The first and second lenses are adhered in the barrel by an ultraviolet (UV) adhesive. The UV adhesive is cured between 75.degrees Celsius and 100.degrees Celsius for 20 to 30 minutes, and is volatilized little. The image sensor is packaged with a Ceramic Leaded Chip Carrier. The structure of the digital camera module is intended to effectively protect the first and second lenses thereof from moisture, dampness, and oxidation.

U.S. Patent Publication No. 20020006687 to Lam discloses an IC chip package for an image sensitive, integrated circuit semiconductor die that incorporates all the components typically found in an imaging module of an electronic camera. The IC chip package consists of a plastic substrate base for holding an image sensor die and a separate, plastic upper cover for encapsulating the image sensor die and holding a filter glass, an optical lens, and providing an aperture for the optical lens. The upper cover has a lower shelf for holding the optical lens in alignment with the aperture opening over the image sensor die, and has an upper shelf for holding the filter glass over the optical lens. The lens is attached to the lower shelf using UV cure adhesive, and its focal distance to the image sensor die is determined by first electrically activating the image sensor die, adjusting the lens position to identify the optimal focus sharpness, and then applying UV light to activate the UV cure adhesive and hold the lens in focus.

SUMMARY OF THE INVENTION

Preferably, exemplary embodiments of the present invention provide a system and method that accurately positions and secures one or more image sensors adjacent to a color separation prism. Such accurate positioning and fixation facilitates improved image quality in a digital video system employing an exemplary embodiment of the present invention.

A method of fixing an image sensor to a beamsplitter in accordance with an exemplary embodiment of the present invention is set forth in claim 1. The exemplary method comprises placing a first fixative agent comprising a UV adhesive between the image sensor and the beamsplitter and positioning the image sensor relative to the beamsplitter. The position of the image sensor is initially fixed relative to the beamsplitter by the first fixative agent. The exemplary method further comprises securing the image sensor to the beamsplitter with a second fixative agent.

In one exemplary embodiment of the present invention, the second fixative agent comprises solder. In another exemplary embodiment, the second fixative agent comprises a UV adhesive. In yet another exemplary embodiment, the second fixative agent comprises a two-part epoxy. In still another exemplary embodiment, at least one of the first fixative agent or the second fixative agent is applied as a wedge-shaped configuration.

An imaging system having an image sensor aligned relative to a beamsplitter in accordance with an exemplary embodiment of the present invention is set forth in claim 6. The exemplary imaging system comprises a first fixative agent comprising an ultraviolet (UV) adhesive disposed between the image sensor and the beamsplitter to initially fix the position of the image sensor relative to the beamsplitter. The imaging system additionally comprises a second fixative agent disposed to secure the image sensor to the beamsplitter.

DETAILED DESCRIPTION OF PREFERRED EMBODIMENTS

Figure 1:
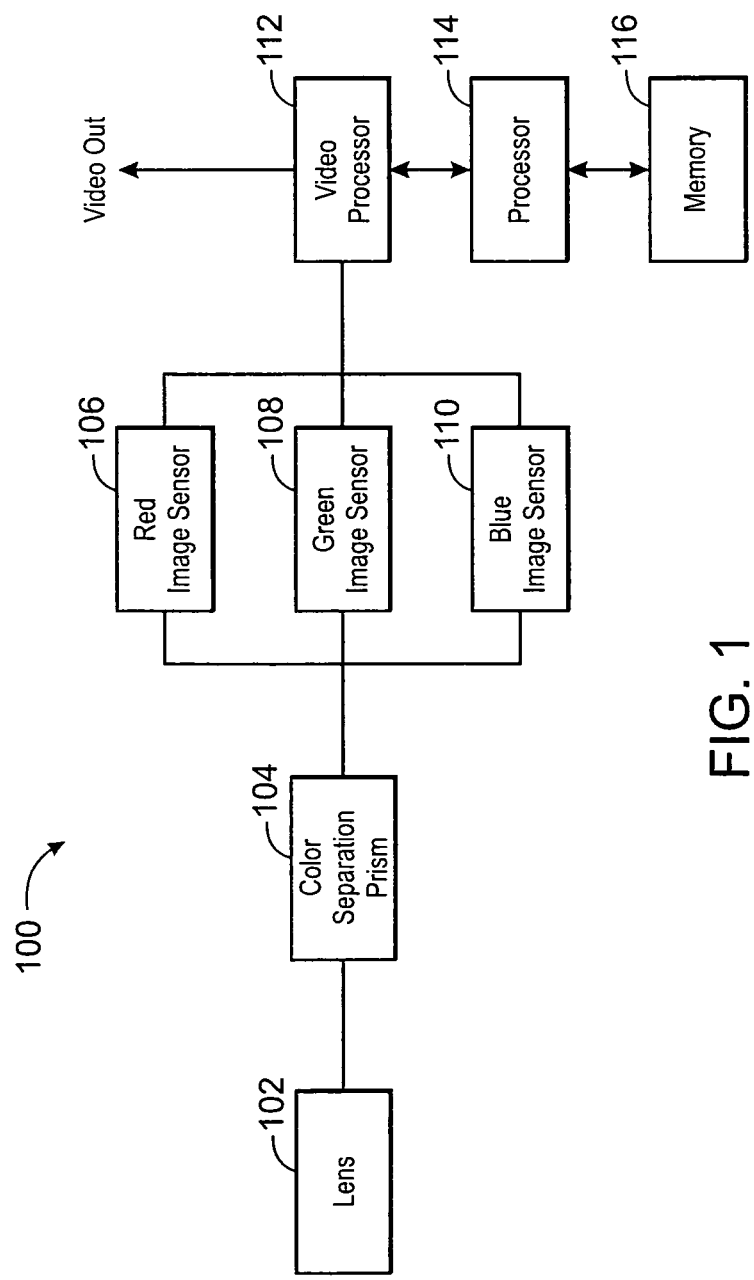
FIG. 1 is a block diagram of a digital video camera system in accordance with an exemplary embodiment of the present invention.

FIG. 1 shows an exemplary digital video camera system 100 in accordance with an exemplary embodiment of the present invention. The skilled person will appreciate that the functional blocks shown in FIG. 1 may comprise hardware elements (including circuitry), software elements (including computer code stored on a machine-readable medium) or a combination of both hardware and software elements.

The camera system 100 comprises a lens 102. A beamsplitter (which may be referred to as a color splitter) comprises a color separation prism 104 receives light directed to it by the lens 102 and separates the light into three color components: a red component, a green component and a blue component. The red color component is directed to a red image sensor 106. The green color component is directed to a green image sensor 108. The blue color component is directed to a blue image sensor 110. The positioning of the color separation prism 104 relative to the red image sensor 106, the green image sensor 108 and the blue image sensor 110 is set forth in detail below.

The outputs of the red image sensor 106, the green image sensor 108 and the blue image sensor 110 are delivered to a video processor 112. Under control of a system processor 114, the video processor 112 produces a video output signal corresponding to a series of images captured by the image sensors.

The skilled person will appreciate that the system processor 114 controls the overall operation of the camera system 100. A memory 116 is operably coupled to the system processor 114. The skilled person will appreciate that the memory 116 is illustrated as a single block in FIG. 1 for purposes of simplicity. In fact, the memory 116 may comprise volatile memory portions and non-volatile memory portions that each performs different functions. For example, a volatile memory portion of the memory 116 may store computer-readable instructions that cause the system processor 114 to control the overall operation of the camera system 100. In addition, a non-volatile memory portion of the memory 116 may store video images recorded by the camera system 100 for later display.

An exemplary embodiment of the present invention relates to a system and method of positioning the red image sensor 106, the green image sensor 108 and the blue image sensor 110 relative to the color separation prism 104. To achieve improved stability during the life of an image sensor suspension, a solder joint is capable of withstanding humidity and external force. Also the solder joint does not displace due to the relaxation of internal stress as glue does. The downside of employing a solder joint in a one-step fixation process is difficulty in implementation. If the position of the image sensor 106, 108, 110 relative to the color separation prism 104 moves when placing the solder tin, corrective action is likely not possible.

An exemplary embodiment of the present invention employs a two-step positioning process in which a first fixative agent comprising a UV curing adhesive is first applied between the image sensors 106, 108, 110 and the color separation prism 104 and fixed. Thereafter, the image sensor is secured on the color separation prism 104 with a second fixative agent such as solder or another adhesive. In one exemplary embodiment of the present invention, a fixation body having two layers of UV adhesive is placed between at least one image sensor 106, 108, 110 and the color separation prism 104.

UV glue is desirable as an initial fixative substance in an exemplary method because UV glue induces less forces when cured than a solder joint. Also, UV glue is more controllable on an alignment machine in that the use of UV glue results in no outgassing of flux and no heat transfer to the image sensor 106, 108, 110 and color separation prism 104. This again results in a higher initial fixation accuracy and a higher yield due to less contamination of the imaging sensor 106, 108, 110 and the color separation prism 104. The skilled person will appreciate that UV glue is more susceptible to environmental conditions than solder or epoxy adhesive. Therefore, an exemplary embodiment of the present invention employs added solderable wedges (spacers) in a controlled environment after the intitial UV cure fixation on the machine.

After application of the initial UV glue fixative, displacement can be corrected and the position can be frozen within seconds. The skilled person will appreciate that any suitable means for positioning the image sensor relative to the color separation prism may be used. The glue gap is kept to a minimum and an adhesive with the least possible shrinkage is used. If such a process is employed, the position of the image sensor 106, 108, 110 relative to the color separation prism 104 can be controlled up to about 0.5 micrometer.

Figure 2:
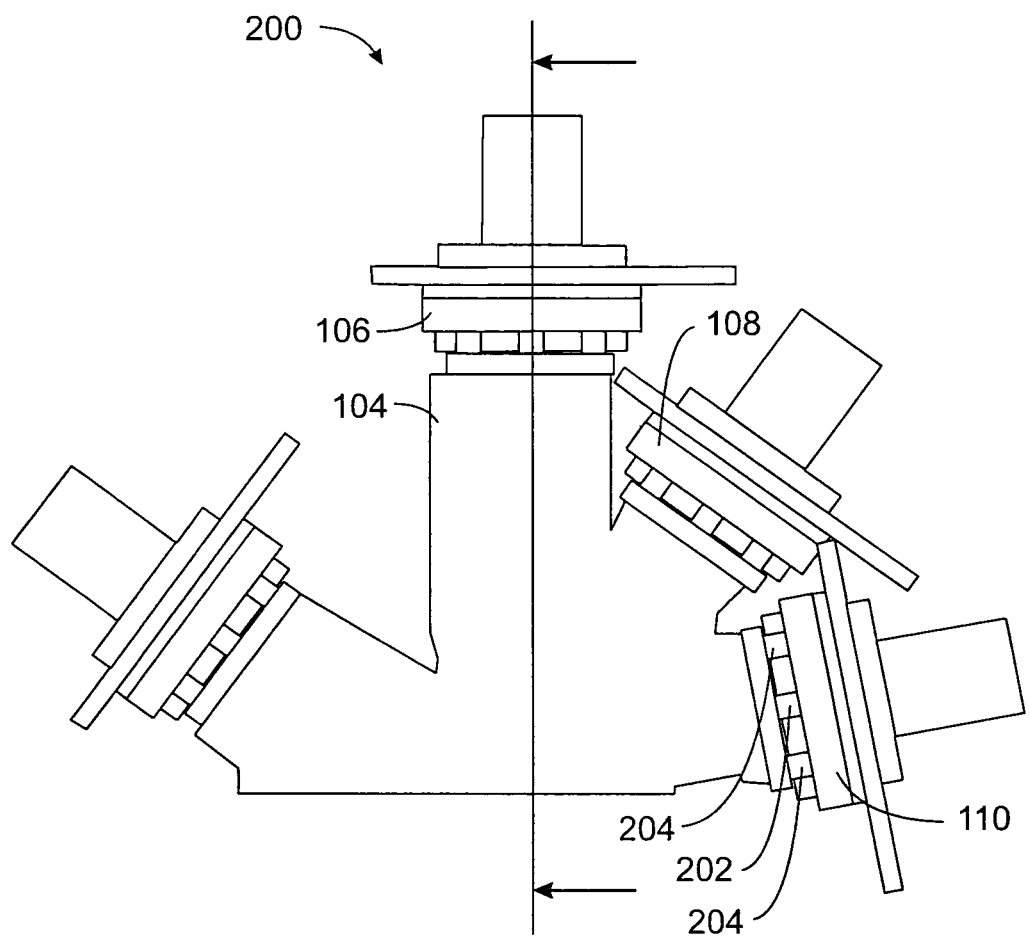
FIG. 2 is a diagram showing the positioning of a plurality of image sensors relative to a beamsplitter by an alignment system in accordance with an exemplary embodiment of the present invention.

FIG. 2 is a diagram showing the positioning of a plurality of image sensors relative to a color separation prism by an alignment system in accordance with an exemplary embodiment of the present invention. The diagram is generally referred to by the reference number 200. The diagram 200 shows the positioning of the red image sensor 106, the green image sensor 108 and the blue image sensor 110 relative to the color separation prism 104. A glass wedge is employed to apply a wedge of UV adhesive 202 as a first fixative agent in accordance with an exemplary embodiment of the present invention. After the application of the UV adhesive, final positioning of the image sensors is performed.

Once the position of the color separation prism 104 relative to the image sensor 106, 108, 110 is fixed using the UV concept, one or more pre-tinned solder bodies 204 may be added to deliver the final fixation. In an exemplary embodiment of the present invention, the bodies of the UV adhesive 202 and the solder bodies 204 are wedge-shaped. Wedge-shaped bodies enable gap filling without increasing the volume and/or thickness of the adhesive and solder tin.

In some known one-step methods of imager fixation, it is difficult to control the solder thickness. This results in more shrinkage when the sensor needs more travel to get into focus. This shrinkage then results in more fluxuation during fixation. In an exemplary embodiment of the present invention, this problem is resolved by the use of wedge shapes for the fixative materials. Wedge shapes result in a constant solder and adhesive thickness and thus a higher accuracy and more controlled process.

The skilled person will appreciate that the length of the wedge is an important factor in the initial fixation accuracy. By shortening the wedge, greater positioning accuracy may be obtained because the forces induced by the shrinking of the adhesive decrease and the glue gap becomes smaller, though this shortening may also decrease the final stability of the fixation. Accordingly, it may be desirable to add additional wedges after the first fixation to increase stability.

In an exemplary embodiment of the present invention, the second fixative process may be performed using the same UV adhesive as used for the initial fixation rather than solder. In an alternative embodiment of the invention, another adhesive with different properties relative to the initial UV glue fixative can be used for the second fixation process to increase certain performance based on desired system design criteria. For instance, a slow-curing two-part epoxy with high humidity resistance may be used. Such epoxies are not practically useful in one-step alignment methods because of the relatively long time they need to cure.

Figure 3:
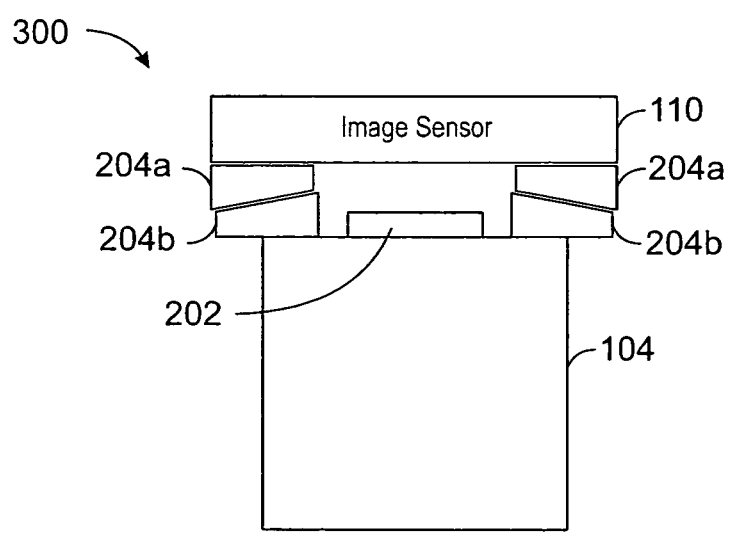
FIG. 3 is a block diagram showing an imaging system in accordance with an exemplary embodiment of the present invention.

FIG. 3 is a block diagram showing an imaging system in accordance with an exemplary embodiment of the present invention. The imaging system is generally referred to by the reference number 300. The imaging system 300 shows the fixation of the image sensor 110 relative to the color separation prism 104. In the imaging system 300, a first fixative agent dispenser provides a UV glue wedge 202 to initially set the position of the image sensor 110 relative to the color separation prism 104. After the image sensor 110 is accurately positioned and fixed, a second fixative agent dispenser applies multiple wedge-shaped pairs 204a, 204b of a second fixative material to secure the image sensor 110 into place.

Figure 4:
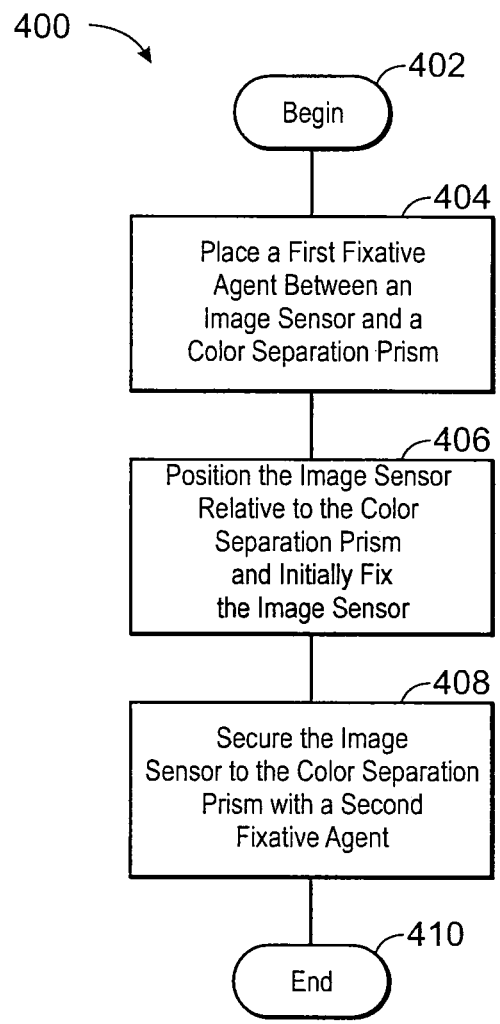
FIG. 4 is a process flow diagram showing a process of positioning an image sensor relative to a beamsplitter in accordance with an exemplary embodiment of the present invention.

FIG. 4 is a process flow diagram showing a process of positioning an image sensor relative to a color separation prism in accordance with an exemplary embodiment of the present invention. The process is generally referred to by the reference number 400. At block 404, the process begins.

At block 404, a first fixative agent is placed between an image sensor such as the image sensors 106, 108, 110 (FIG. 1) and a color separation prism such as the color separation prism 104 (FIG. 1). In an exemplary embodiment of the present invention, the first fixative agent comprises a UV adhesive. Further, the first fixative agent is desirably applied in a wedge-shaped configuration. At block 406, the image sensor is positioned and fixed relative to the color separation prism. This positioning may take place while the first fixative agent is curing. Subsequently, the image sensor is secured into place using a second fixative agent, as shown at block 408. At block 410, the process ends.

The skilled person will appreciate that combining any of the above-recited features of the present invention together may be desirable.

What is claimed, is:

1. A method for fixing an image sensor to a beamsplitter, comprising:
   placing a first fixative agent comprising an ultraviolet adhesive between the image sensor and the beamsplitter, wherein the first fixative agent is applied with a glass wedge;
   positioning the image sensor relative to the beamsplitter;
   initially fixing the image sensor relative to the beamsplitter by curing the first fixative agent; and
   securing the image sensor to the beamsplitter with a wedge shaped adhesive having properties different from the first fixative agent.

2. The method of claim 1, wherein the first fixative agent comprises a UV adhesive.

3. The method of claim 1, wherein a wedge of the ultraviolet adhesive is applied as the first fixative agent.

4. The method of claim 3, wherein a wedge-shaped solder body is applied as the wedge shaped adhesive.

5. The method of claim 1, wherein a wedge-shaped solder body is applied as the wedge shaped adhesive.

6. The method of claim 1, wherein the wedge shaped adhesive comprises at least one wedge-shaped pair of the wedge shaped adhesive.

7. The method of claim 1, wherein the wedge shaped adhesive comprises multiple wedge-shaped pairs of the wedge shaped adhesive.

8. An imaging system having an image sensor aligned relative to a beamsplitter, comprising:
   a first fixative agent comprising an ultraviolet adhesive disposed between the image sensor and the beamsplitter, wherein the first fixative agent is applied with a glass wedge, and wherein the image sensor is positioned relative to a color separation prism; and
   a wedge shaped adhesive, having properties different from the first fixative agent, disposed to rigidly secure the image sensor to the beamsplitter.

9. The system of claim 8, wherein the wedge shaped adhesive comprises a UV adhesive.

10. The system of claim 8, wherein the wedge shaped adhesive comprises solder.

11. The system of claim 8, wherein the wedge shaped adhesive comprises a UV adhesive.

12. The system of claim 8, wherein the wedge shaped adhesive comprises a two-part epoxy.

13. The system of claim 8, wherein a wedge of the ultraviolet adhesive is applied as the first fixative agent.

14. The system of claim 13, wherein a wedge-shaped solder body is applied as the wedge shaped adhesive.

15. The system of claim 8, wherein a wedge-shaped solder body is applied as the wedge shaped adhesive.

16. The system of claim 8, wherein the wedge shaped adhesive comprises at least one wedge-shaped pair of the wedge shaped adhesive.

17. The system of claim 8, wherein the wedge shaped adhesive comprises multiple wedge-shaped pairs of the wedge shaped adhesive.

18. The system of claim 8, wherein a plurality of wedge shaped solder bodies are provided between the beamsplitter and the image sensor and a plurality of glass wedges are provided between the beamsplitter and the image sensor, wherein the wedge shaped solder bodies are provided alternately with the plurality of glass wedges.

19. A method for fixing an image sensor to a beamsplitter, comprising:
placing a first fixative agent comprising an ultraviolet adhesive between the image sensor and the beamsplitter, wherein the first fixative agent is applied with a glass wedge;
positioning the image sensor relative to the beamsplitter;
initially fixing the image sensor relative to the beamsplitter by curing the first fixative agent; and
securing the image sensor to the beamsplitter with a second fixative agent having properties different from the first fixative agent, wherein the second fixative agent is wedge shaped,
wherein a plurality of wedge shaped solder bodies are provided between the beamsplitter and the image sensor and a plurality of glass wedges are provided between the beamsplitter and the image sensor, wherein the wedge shaped solder bodies are provided alternately with the plurality of glass wedges.

* * * * *